(12) United States Patent
Deets

(10) Patent No.: US 6,830,417 B2
(45) Date of Patent: Dec. 14, 2004

(54) APPARATUS AND SYSTEM FOR SIMULTANEOUSLY TRANSPORTING FREIGHT AND PASSENGERS

(76) Inventor: Edward Deets, 55 Brook La., Mountaintop, Luzerne County, PA (US) 18707

( * ) Notice: Subject to any disclaimer, the term of this patent is extended or adjusted under 35 U.S.C. 154(b) by 0 days.

(21) Appl. No.: 10/256,688

(22) Filed: Sep. 29, 2002

(65) Prior Publication Data

US 2004/0062620 A1 Apr. 1, 2004

(51) Int. Cl.⁷ .................................................. B60P 3/07
(52) U.S. Cl. .......................................................... 410/4
(58) Field of Search .............................. 410/4, 24, 26, 410/29.1; 296/203.01, 204, 178, 181, 182, 205, 182.01; 180/311, 14.1; 280/423.1, 424

(56) References Cited

U.S. PATENT DOCUMENTS

| | | | |
|---|---|---|---|
| 2,541,288 A | * | 2/1951 | Rice |
| 3,285,194 A | | 11/1966 | Clejan |
| 3,503,340 A | | 3/1970 | Warren |
| 3,557,712 A | | 1/1971 | Milenkovic |
| 3,584,584 A | | 6/1971 | Milenkovic |
| 3,734,558 A | * | 5/1973 | Stead |

(List continued on next page.)

FOREIGN PATENT DOCUMENTS

JP          406262976 A  *  9/1994  .................. 410/26

Primary Examiner—D. Glenn Dayoan
Assistant Examiner—H. Gutman
(74) Attorney, Agent, or Firm—Mitchell A. Smolow

(57) ABSTRACT

In a first preferred embodiment, the present invention comprises a passenger truck cab unit which includes a body mounted to and supported by a truck chassis and a lower structure mounted to and supported by the truck chassis for additional support of the body; a freight transport unit; and a hitch mounted to and supported by the truck chassis for attaching the freight transport unit to the passenger truck cab unit. The body comprises a door opening extending into the lower structure for providing a vehicle operator entry and exit separate from a driver compartment door. The passenger truck cab unit tows the freight transport unit. In a second preferred embodiment, the hitch is removed and replaced by decking of sufficient strength to support and transport a load of freight. The present invention also includes the method of simultaneously transporting freight and at least one passenger, as well as the passenger truck cab unit used in simultaneously transporting the freight and at least one passenger.

29 Claims, 6 Drawing Sheets

U.S. PATENT DOCUMENTS

| | | | |
|---|---|---|---|
| 3,785,514 A | | 1/1974 | Forsyth et al. |
| 3,892,188 A | | 7/1975 | Warren |
| 3,933,258 A | | 1/1976 | Forsyth et al. |
| 3,961,716 A | * | 6/1976 | Renaud ........................ 214/85 |
| D249,667 S | * | 9/1978 | Thompson ................. D12/103 |
| 4,121,684 A | * | 10/1978 | Stephens et al. ......... 180/89.14 |
| 4,201,415 A | | 5/1980 | Suchanek |
| 4,397,496 A | * | 8/1983 | Drygas, III ..................... 410/4 |
| 4,705,136 A | * | 11/1987 | Godsoe et al. .............. 180/277 |
| 4,775,179 A | * | 10/1988 | Riggs ...................... 296/180.2 |
| 4,787,670 A | * | 11/1988 | Bentz ...................... 296/182.1 |
| 4,854,631 A | * | 8/1989 | Laursen ...................... 296/158 |
| 4,892,345 A | * | 1/1990 | Rachael, III ............. 296/24.37 |
| 5,083,834 A | * | 1/1992 | Moffatt et al. ............ 296/26.02 |
| 5,102,184 A | * | 4/1992 | Cook ............................. 410/4 |
| 5,310,239 A | * | 5/1994 | Koske et al. ............ 296/26.08 |
| 5,314,200 A | * | 5/1994 | Phillips ...................... 296/181 |
| 5,575,491 A | * | 11/1996 | Fenton .................... 280/417.1 |
| 5,651,579 A | * | 7/1997 | Krieger ...................... 296/178 |
| 5,669,307 A | * | 9/1997 | Cichy .......................... 104/28 |
| 5,678,883 A | * | 10/1997 | Bittner et al. ............... 296/178 |
| 5,889,627 A | * | 3/1999 | Englander et al. .......... 359/864 |
| 5,890,728 A | * | 4/1999 | Zilm ......................... 280/433 |
| 5,899,656 A | * | 5/1999 | Rahe et al. ................... 410/24 |
| 5,921,615 A | * | 7/1999 | Gimenez .................... 296/164 |
| 6,135,532 A | * | 10/2000 | Martin ....................... 296/61 |
| 6,241,308 B1 | | 6/2001 | Gaspard, II et al. |
| 6,336,676 B2 | * | 1/2002 | Gaspard, II et al. ........ 296/178 |
| 6,538,612 B1 | * | 3/2003 | King ......................... 343/757 |
| 6,540,285 B2 | * | 4/2003 | Crean ........................ 296/204 |
| 6,554,348 B1 | * | 4/2003 | Gernstein ................... 296/178 |

* cited by examiner

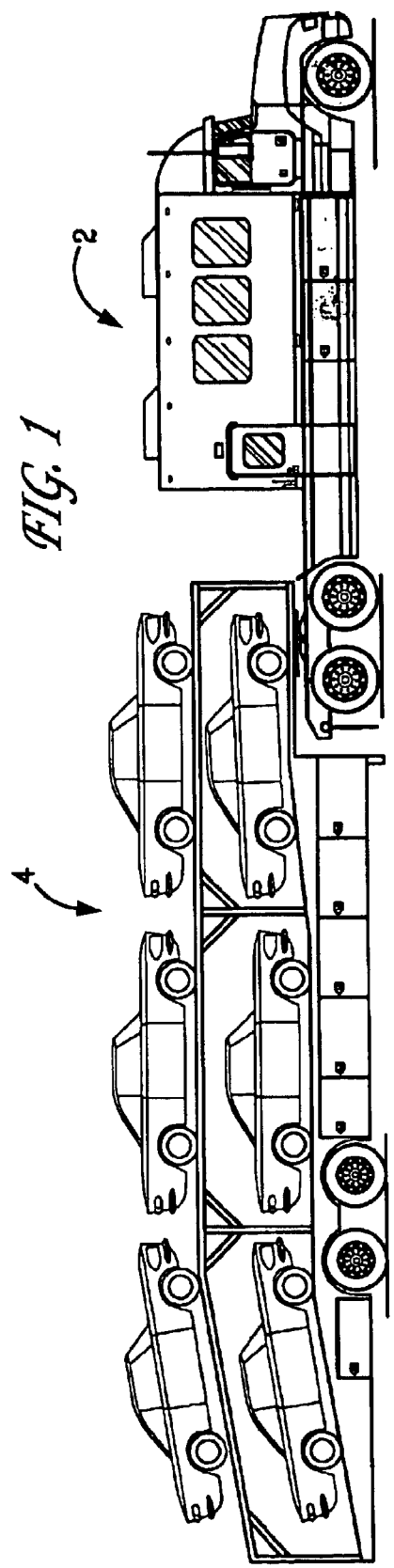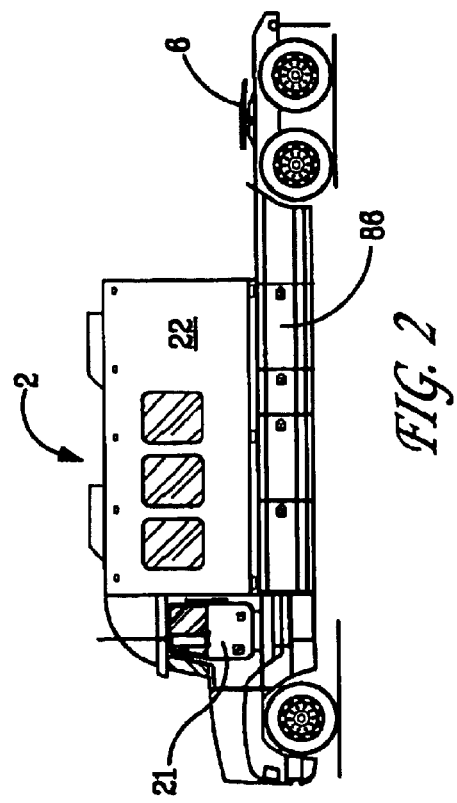

APPARATUS AND SYSTEM FOR SIMULTANEOUSLY TRANSPORTING FREIGHT AND PASSENGERS

NOTICE OF COPYRIGHTS AND TRADE DRESS

A portion of the disclosure of this patent document contains material which is subject to copyright protection. This patent document may show and/or describe matter which is or may become trade dress of the owner. The copyright and trade dress owner has no objection to the facsimile reproduction by any one of the patent disclosure, as it appears in the Patent and Trademark Office patent files or records, but otherwise reserves all copyright and trade dress rights whatsoever.

FIELD OF THE INVENTION

This invention relates generally to ground transportation and in particular, to simultaneous transfer of motor vehicles and their operators.

BACKGROUND OF THE INVENTION

With improvements to the Interstate highway system, the decline in available passenger rail service, and increased safety concerns over air travel, travelers are electing with increasing frequency, for both business and pleasure, to utilize ground transportation to travel to their destination. When the stay is for extended periods, it is both advantageous and economical to have one's personal vehicle available at the destination.

In the past, this has been accomplished by either driving the personal vehicle to the destination, shipping the personal vehicle to the destination and collecting it upon arrival, or when available, using combined rail and personal vehicle modes of transport, for example, AMTRAK's "AutoTrain".

Depending on the distance traveled, driving one's personal vehicle to the destination may add significant wear and tear to the vehicle, as well as leave the driver fatigued at the end of the journey. Shipping the vehicle separately saves wear and tear on the vehicle, however, the vehicle's operator may arrive at the destination prior to the vehicle, creating logistical problems and wasted time for the operator. Although transportation modes such as the AutoTrain have attempted to solve these logistical problems by transporting the vehicle and operator together, the destinations served by such rail service are limited in number, with rigid departure and arrival schedules.

Prior attempts to simultaneously transport, via ground transportation, freight and passengers have met with limited success. For example, U.S. Pat. No. 6,241,308 to Gaspard, II, et al. (the '308 patent) is directed to a vehicle divided into a passenger area and a freight area to transport passengers and freight. The freight preferably is transported within an intermodal container. The vehicle is a truck frame interconnected to a coach spine in a three-dimensional region as an integrally-framed vehicle to support both the passenger area and the freight area. This results in forces from a load on the freight area being distributed across the frame of the vehicle over the three-dimensional region and into the passenger area. A conventional engine is preferably positioned at the rear portion of the vehicle beneath the freight area.

U.S. Pat. No. 4,201,415 to Suchanek (the '415 patent) is directed to a long distance truck tractor with two interior levels including driving and navigation equipment and living quarters with sleeping compartments. A stairway interconnects the two levels, with the engine located in the rear of the truck tractor. While not specifically disclosed, such a truck tractor may be used to haul a known, conventional, multi-vehicle trailer.

U.S. Pat. No. 3,933,258 to Forsyth, et al. (the '258 patent) is directed to a vehicular transportation system wherein small electrically driven passenger vehicles are carried as a group in a transporter or carrier vehicle. The transporter vehicle carries extendable ramps which may be deployed from either end of the vehicle body for loading and unloading the passenger vehicles. The transporter vehicle and electrically driven passenger vehicles operate as a combined unit to reduce fuel consumption, air pollution, and congestion, or it may operate independently as separate elements on highways or expressways or surface streets.

U.S. Pat. No. 3,785,514 to Forsyth, et al. (the '514 patent) is directed to a transporter vehicle employed for transporting a plurality of small passenger satellite vehicles or cars on a conventionally designed rapid transit main traffic artery or freeway. An on-ramp is provided leading to the main traffic artery for accommodating entry of an approaching transporter vehicle so that it may merge with oncoming controlled groups of other transporter vehicles.

The engine locations described by the above referenced patents prohibit easy engine access. Additionally, an integrated freight hauling-passenger frame as described in the '308 patent, limits the volume of freight capable of being transported due to physical size and design limitations inherent in the use of a single vehicle frame. Accordingly, it would be desirable to provide simultaneous vehicle and operator transporting assemblies of a design having performance characteristics that will increase the freight hauling and simultaneous passenger carrying capabilities while providing ease of access to critical engine components. The present invention fulfills this need, and further provides related advantages.

BRIEF SUMMARY OF THE INVENTION

The present invention identifies additional criteria from which to design a transportation system for simultaneously transporting vehicles and their operators. The system provides for extending a conventional truck cab to include a passenger section in combination with a separate vehicle carrying trailer.

In a first preferred embodiment, the present invention comprises a passenger truck cab unit which includes a body mounted to and supported by a truck chassis and a lower structure mounted to and supported by the truck chassis for additional support of the body; a vehicle transport unit for transporting the at least one vehicle; and a hitch mounted to and supported by the truck chassis for attaching the vehicle transport unit to the passenger truck cab unit.

The body comprises a door opening extending into the lower structure for providing a vehicle operator entry and exit separate from a driver compartment door. The passenger truck cab unit tows the vehicle transport unit.

In a second preferred embodiment, the hitch is removed and replaced by decking of sufficient strength to support and transport a load of freight.

The present invention also includes the method of simultaneously transporting at least one vehicle and at least one vehicle operator, as well as the passenger truck cab unit used in simultaneously transporting at least one vehicle and at least one vehicle operator.

The present invention also includes the method of simultaneously transporting a load of freight and at least one passenger, as well as the passenger truck cab unit used in simultaneously transporting the freight load and at least one passenger.

One advantage of the present invention is the ability to insure simultaneous arrival of a vehicle operator and his vehicle.

Another advantage is the ability to economically service smaller markets. Current systems for transporting vehicles and their operators by highway employ known full size buses to transport vehicles operators and known full size tractor trailers to transport their vehicles. A smaller market or a newly entered market may not generate enough business to economically justify continued operation. The present invention provides economic advantages to economically justify service of these markets until business revenue justifies use of the larger, separate units.

Still another advantage is that use of a heavier truck tractor frame and truck engine increases the service life.

Yet another advantage is that use of forward engine mounted truck tractors permits easy access to the truck engine for maintenance and repair.

Other features and advantages of the present invention will be apparent from the following more detailed description of the preferred embodiments, taken in conjunction with the accompanying drawings which illustrate, by way of example, the principles of the invention.

BRIEF DESCRIPTION OF THE DRAWINGS

FIG. 1 is a side view of the passenger truck cab unit and the vehicle transport unit.

FIG. 2 is a drive side view of the passenger truck cab unit.

DETAILED DESCRIPTION OF THE INVENTION

The present invention relates to the simultaneous transport of freight and at least one passenger. While the following description describes the invention as it relates to the simultaneous transport of at least one vehicle and at least one vehicle operator, it should be apparent to those skilled in the art that any freight transportation vehicle capable of hitching to a truck tractor may be substituted for the vehicle transport unit and that any type of passenger may be substituted for a vehicle operator.

FIG. 1 is a side view of the present invention wherein the freight is at least one vehicle and the passenger is at least one vehicle operator. The two primary components are a passenger truck cab unit 2 and a vehicle transport unit 4. As used herein, the term "vehicle" refers to any self-propelled unit capable of transporting a driver from one location to another, for example, an automobile, a light truck, a motorcycle or a boat.

Figure 3:
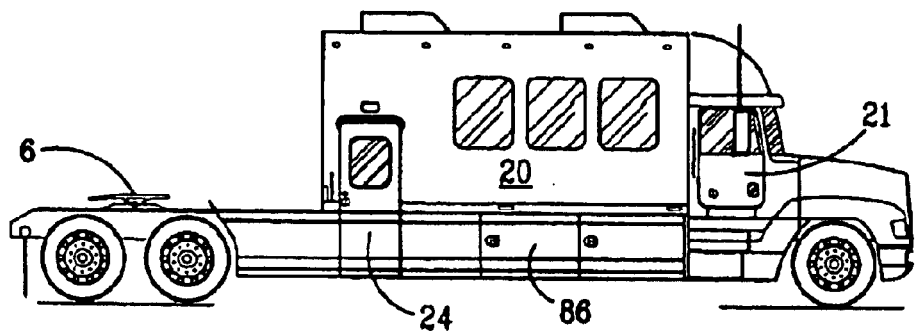
FIG. 3 is a passenger side view of the passenger truck cab unit.

The vehicle transport unit 4 is any non-self propelled unit capable of carrying one or more vehicles. Vehicle transport units are well known in the art, and will not be described in detail herein. The vehicle transport unit 4 is connected to the passenger truck cab unit 2 by a hitch 6, shown in FIGS. 2 and 3. The passenger truck cab unit 2 provides both the power for towing the vehicle transport unit 4 and seating for concurrent transportation of the operator(s) of the vehicle(s) carried by the vehicle transport unit.

Figure 4:
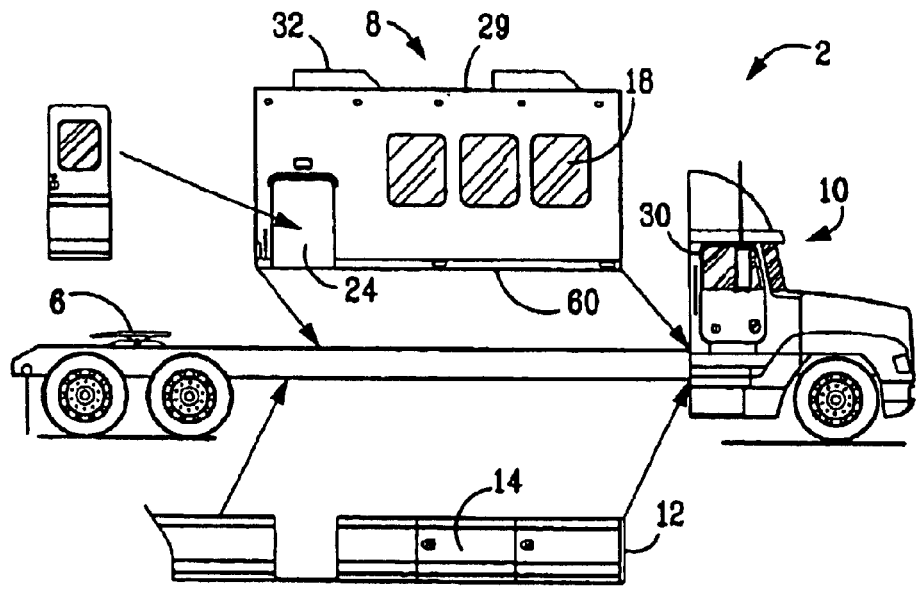
FIG. 4 is an exploded view of the major components of the passenger truck cab unit.

Turning to FIG. 4, the passenger truck cab unit 2 is comprised of three major sub-components: a body 8, a truck chassis 10 and a lower structure 12. In a preferred embodiment, the lower structure 12 comprises at least one storage bay, for example, a luggage bay 14. The attachment of the sub-components to one another is accomplished by known methods of attachment, for example, welding, bolting, riveting, etc.

Figure 5:
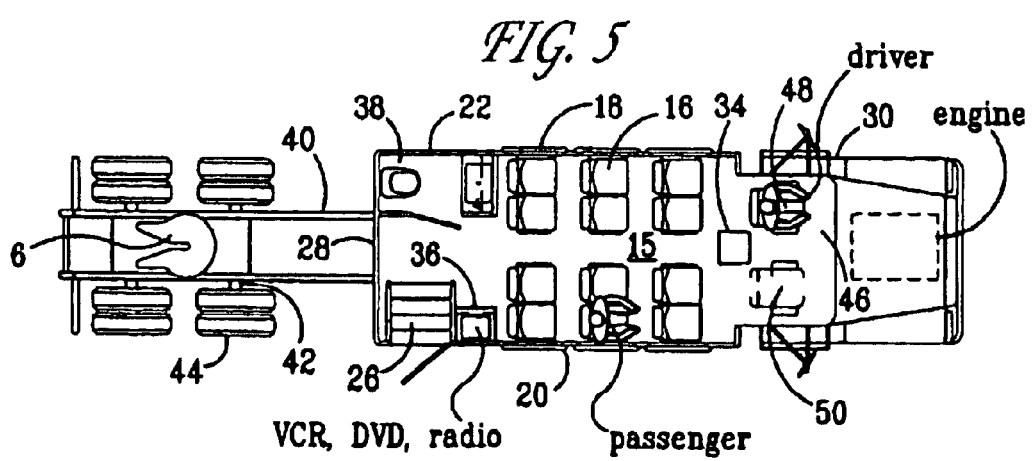
FIG. 5 is a top view of the interior of the passenger truck cab unit.

The body 8 comprises a compartment 15 which is supported by and attached to the truck chassis 10. As shown in FIG. 5, contained within the compartment 15 are seats 16 for at least one passenger (not shown). In a preferred embodiment, the body 8 is about sixteen feet in length, about 102 inches in width and about 13 feet in height. The exterior of the body is manufactured from any material capable of providing protection from the elements, for example, metals such as aluminum alloys, stainless steel; and other such sheet metals; ceramics such as fiberglass; polymers; and the like.

Fabricated into each body side wall is at least one window unit 18. As used herein, the side wall adjacent to the passenger side of the truck cab is referred to as the passenger side wall 20, and the side wall adjacent to the driver side of the truck cab to is referred to as the driver side wall 22. The passenger side wall 20 has a cut out for an access door opening 24. To allow for easy entry and exit into the body 8, the door opening 24 extends into the lower structure 12 and contains a stairway 26.

The rear wall 28 of the body 8 preferably contains no openings, however a window unit (not shown) may be installed to permit easy viewing of the vehicle transport unit 4. There is no body forward wall, as the body 8 is mated to the truck cab. Such mating is accomplished by known mating methods, for example, welding, bolting, riveting, etc. The roof 29 of the body 8 optionally contains one or more skylights (not shown) and it further provides support for optional attachments 32, for example, air-conditioning units, heating units, ventilating units, luggage racks and the like.

The only required element within the body 8 is seating for at least one passenger, however, the preferred embodiment contains seating for a plurality of passengers. Twelve seats 16 are arranged in three rows of four seats, with each row containing two seats on either side of a center aisle. The preferred embodiment further includes optional amenities to increase passenger comfort. For example, a television monitor 34 is positioned in front of the forward row of seats 16, preferably suspended from the ceiling. Mounted to the interior of the passenger side wall 20, behind the rearward row of seats 16, is a storage rack 36 for containing items such as a VCR or DVD, a radio and passenger carry on items.

An additional optional amenity is a lavatory/powder room 38. In the preferred embodiment the lavatory/powder room 38 is located in the rear driver side corner of the compartment, opposite the entry/exit stairway 26.

The truck chassis 10 comprises a cab unit 30, a truck frame 40, and a plurality of axles 42 for receiving a plurality of wheels 44. The hitch 6 for attaching the vehicle transport unit 4 is mounted to the truck frame 40.

The cab unit 30 comprises a driver compartment 46, transmission (not shown) and an engine. Contained within the driver compartment 46 is a driver's seat 48 and preferably one additional seat 50. The driver compartment 46 further contains the driving controls and operating indicators (not shown), well known in the art. At least one driver compartment door 21 provides direct access to the driver compartment. Although any known truck cab design may be utilized, in the preferred embodiment, the engine is located in front of the driver so as to allow easy access to the engine for maintenance and service.

Figure 6:
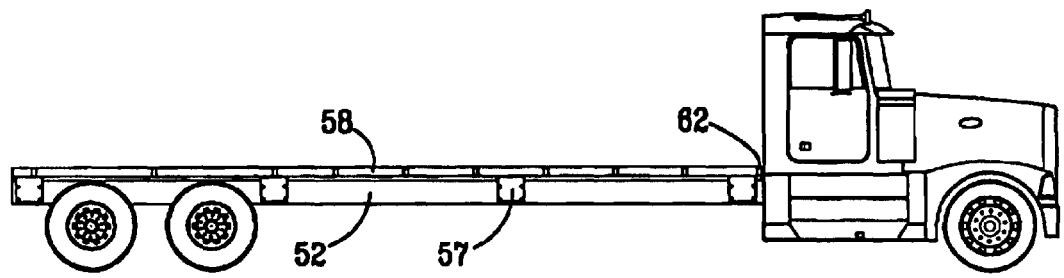
FIG. 6 is a side view of the truck chassis.
Figure 7:
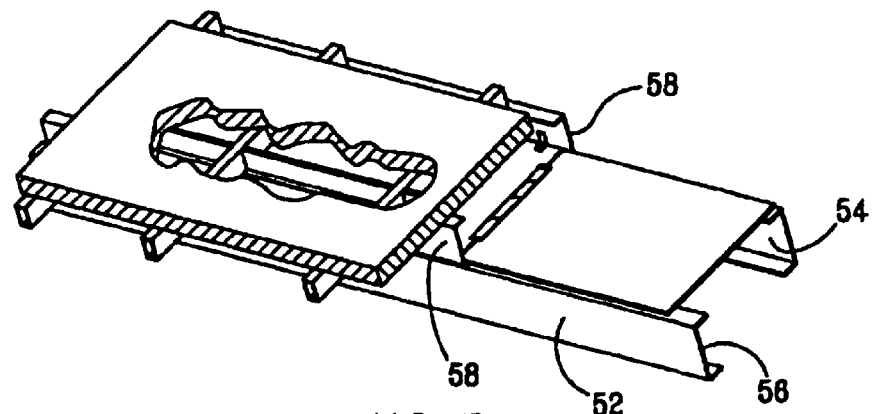
FIG. 7 is a perspective view of a portion of the main support beam, filler and body floor.
Figure 8:
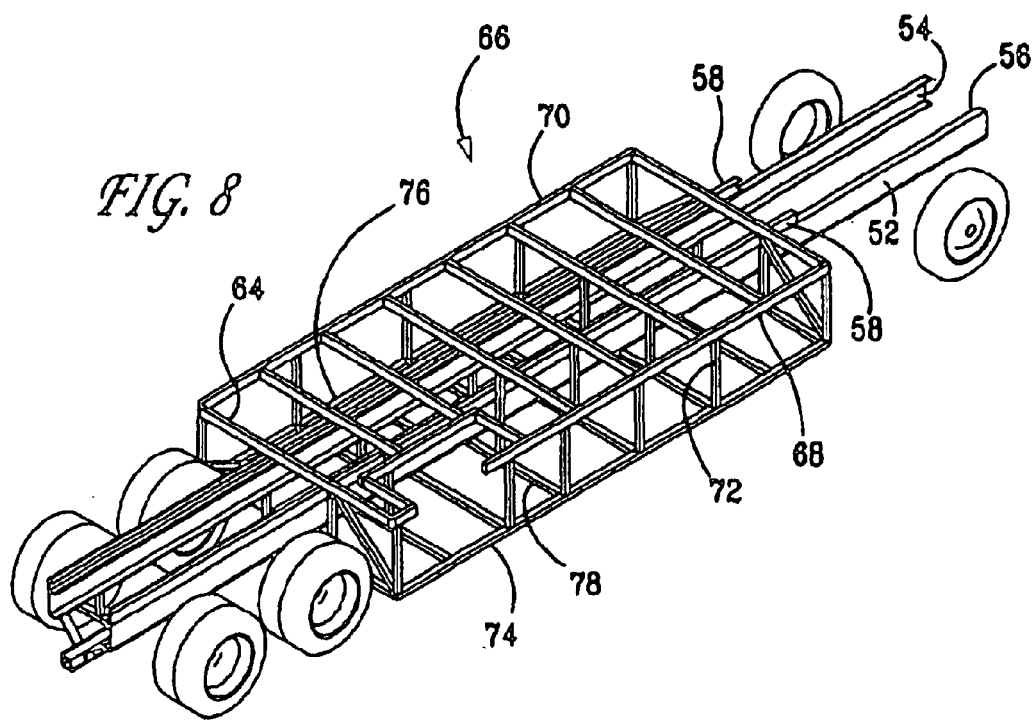
FIG. 8 is a perspective view of the lower structure.

Turning to FIGS. 6, 7, and 8, the truck frame 40 comprises a main support beam 52, for example, at least one unitary support beam. As used herein, a main support beam means a beam spanning substantially the entire length of the passenger truck cab unit 2, as is commonly used by truck cab original equipment manufacturers. In the preferred embodiment, the main support beam 52 comprises a driver side bracket shaped unitary support beam 54 and a passenger side bracket shaped unitary support beam 56 positioned such that the bracket openings face one another. The plurality of axles 42 are mounted to the main support beam 52 using known suspension systems (not shown) and will not be described in detail herein. The wheels 44 are mounted to the axles 42 using known wheel mounting systems (not shown).

Mounted to each main support beam 52, preferably mounted to the top of each main support beam 52 via, for example, a mounting plate 57, is a filler 58 dimensionally sized, for example, in height, to effectively raise the body 8 so that the body floor 60 (FIG. 4) mates to the driver compartment floor 62 at substantially the same height, thereby forming a substantially step-less transition.

The hitch 6 for receiving and attaching the vehicle transport vehicle 4 is mounted to the truck frame 40, for example, to the main support beam 52 by methods well known in the art. Preferably, the hitch 6 is a "fifth wheel" or "dolly hook" type hitch. Both the hitch 6 and the manner in which the hitch is mounted to the main support beam 52 are well known to those skilled in the art and will not be described in detail herein.

Optionally, the hitch 6 is removable, allowing for mounting of removable decking material (shown in FIG. 15 of the second embodiment, described further below) of sufficient strength to effectively transport a load of freight. The freight may be free standing or packaged in a container, for example, an intermodal carrier (not shown). In either case, the freight is secured to the decking material by known freight securing methods.

In the preferred embodiment, a cross member 64 is mounted to and supported by the filler 58. The body 8 is mounted by known methods to and supported by the cross member 64. The cross member 64 further serves as a structural component of the lower structure 12, shown in FIG. 8, thereby securing the lower structure 12 to the truck chassis 10.

The lower structure 12 comprises a structural frame 66 for supporting the body 8, a lower portion of the door frame (not shown), and optionally, at least one compartment 14 for example, at least one luggage bay. While the structural frame 66 as described herein is in the form of a grid pattern, it is to be understood that the primary purpose for the lower structure 12 is to support the body 8, therefore any structural frame 66 design providing such support is acceptable. For example, while in the preferred embodiment the lower structure 12 is in the form of a grid design with the cross members 64 mounted generally perpendicular to the main support beam 52, the cross members 64 maybe mounted in any pattern sufficient to provide effective body support and still provide for a lower door frame (not shown), for example, diagonally or in a diamond shaped pattern.

Figure 9:
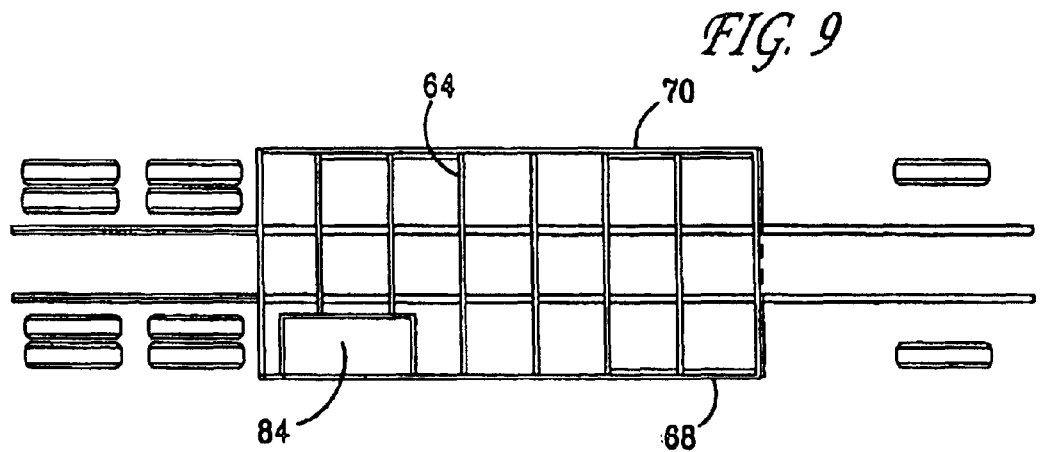
FIG. 9 is view of the top of the lower structure.
Figure 10:
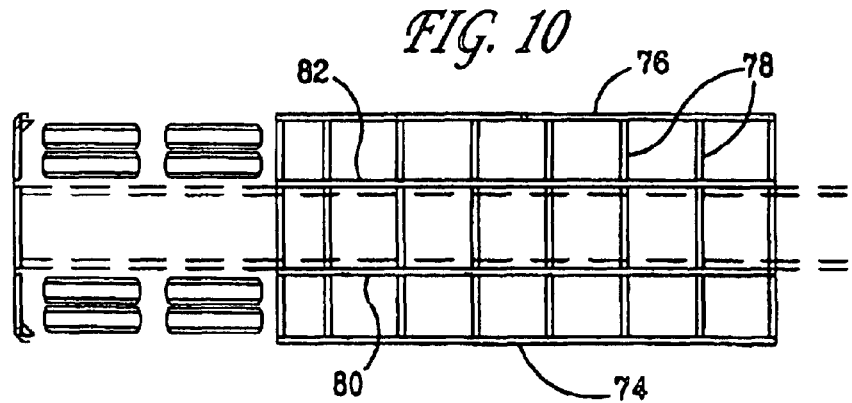
FIG. 10 is a view of the bottom of the lower structure.
Figure 11:
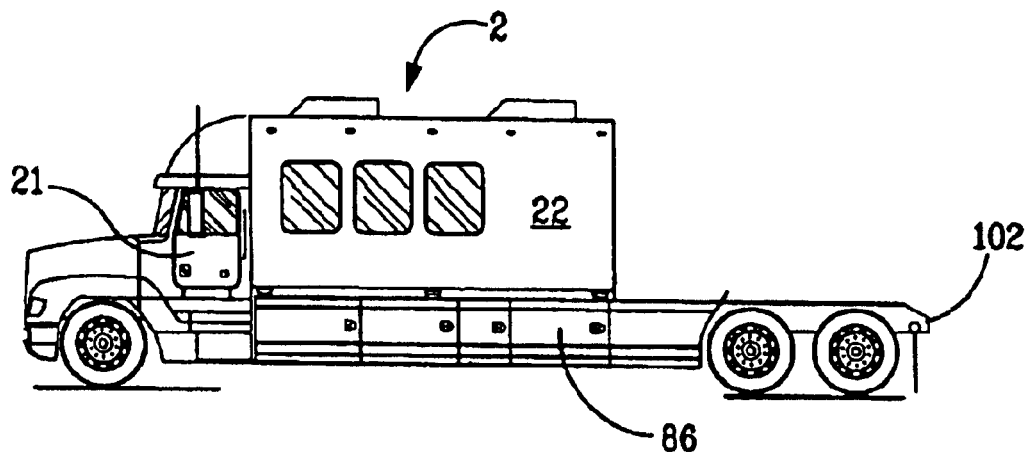
FIG. 11 is a passenger side view of a second embodiment of the present invention.
Figure 12:
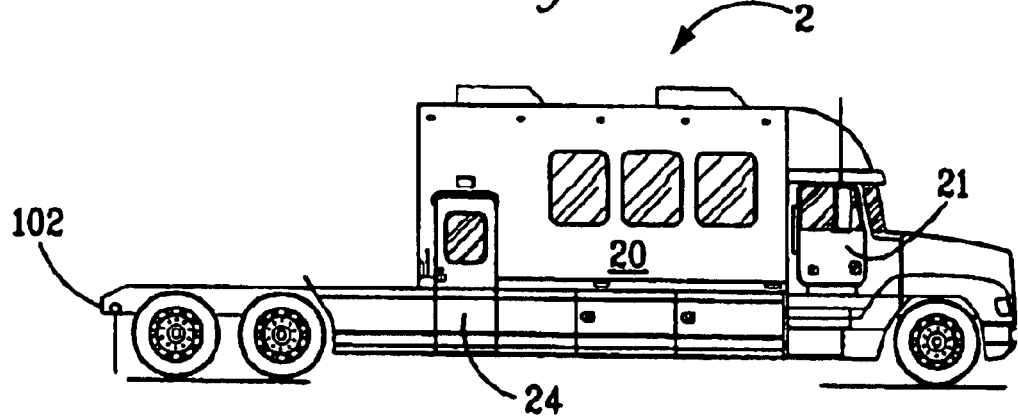
FIG. 12 is a driver side view of a second embodiment of the present invention.
Figure 13:
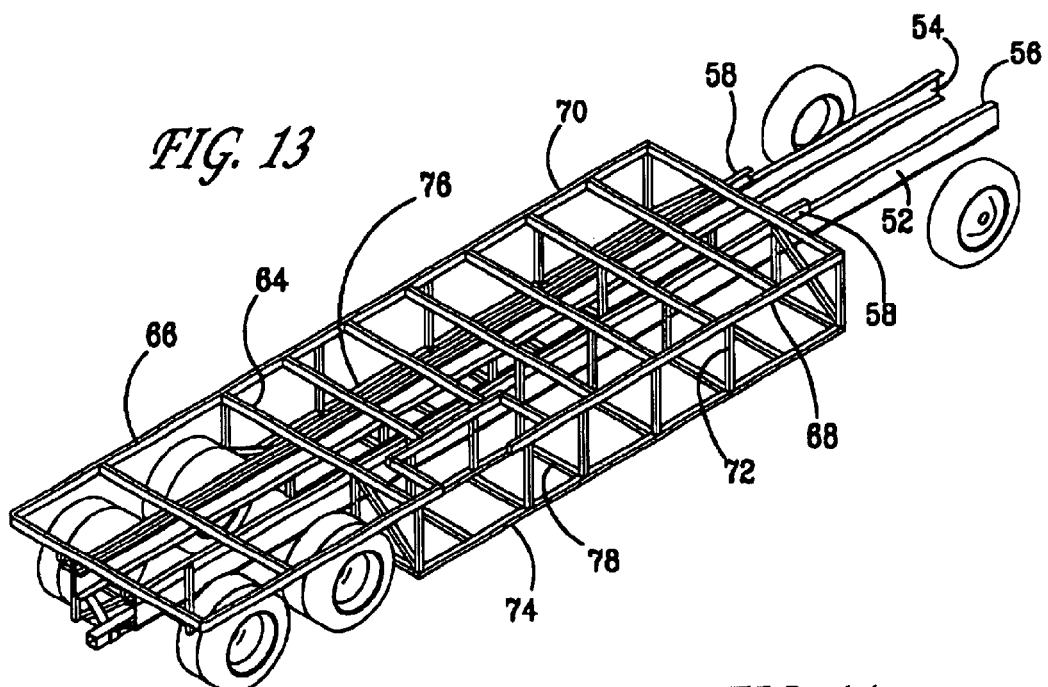
FIG. 13 is a perspective view of the second embodiment lower structure.
Figure 14:
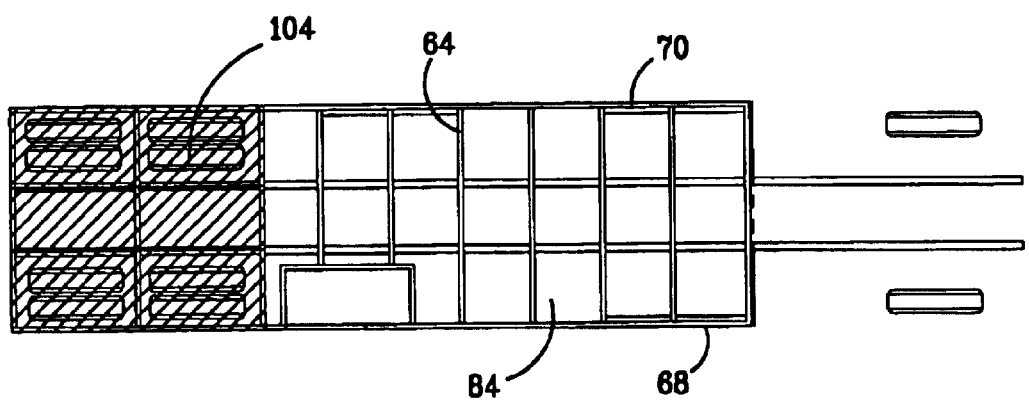
FIG. 14 is view of the top of the second embodiment lower structure.

One advantage of the grid shaped lower structure 12 described herein is its ease of incorporating both the lower door frame (not shown), stairway 26 and at least one storage compartment 14. Referring to FIGS. 8, 9 and 10, a plurality of cross members 64 are mounted to the filler 58 as described above and attached at one end substantially perpendicular to a top passenger side lengthwise member 68 and attached at a second opposite end substantially perpendicular to a top driver side lengthwise member 70. A plurality of vertical supports 72 spaced an effective distance to provide effective body 8 support and permit construction of at least one storage compartment 14 are attached substantially perpendicular between the top passenger side lengthwise member 68 and a bottom passenger side lengthwise member 74 and between the top driver side lengthwise member 70 and a bottom driver side lengthwise member 76.

A first end of a bottom cross member 78 is attached substantially perpendicular to the bottom passenger side lengthwise member 74 and a second opposing end of the bottom cross member 78 is attached substantially perpendicular to the bottom driver side lengthwise member 76. Ideally, the vertical support members 72 are positioned to align with top and bottom cross members 64, 78. While optional, in the preferred embodiment, an inner bottom passenger side lengthwise member 80 and an inner bottom driver side lengthwise member 82 are added for additional support, mounted to the bottom cross member 78 in similar fashion as described above.

Figure 15:
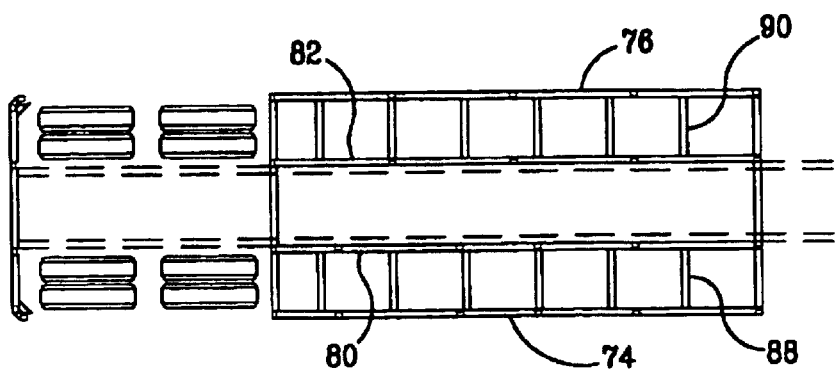
FIG. 15 is a view of the bottom of the second embodiment lower structure.

Optionally, as shown in FIG. 15 of a second embodiment, described in further detail below, a passenger side bottom cross member 88 is attached between bottom passenger side lengthwise member 74 and inner bottom passenger side lengthwise member 80 and a driver side bottom cross member 90 is attached between bottom driver side lengthwise member 76 and inner bottom driver side lengthwise member 82, thereby leaving the space under the main support beam 52 substantially unobstructed by cross members.

A cutout 84 is provided in the top passenger side lengthwise member to allow for the door frame (not shown), while still maintaining effective body 8 support. Flooring (not shown) is attached to and supported by the bottom lengthwise members 74, 76, 80, 82 and bottom cross members 78 by any known method, for example, by screwing, bolting, nailing, or gluing. Baggage door assemblies 86 (FIG. 2) are mounted by any known method to the exterior frame formed by the top and bottom lengthwise members 68, 70, 74, 76 and the vertical support members 72, thereby permitting secure access the storage space compartment 15.

In operation, the vehicle transport unit is attached to the passenger truck cab unit utilizing the hitch. The vehicle or vehicles to be transported are loaded onto the vehicle transport unit. The operators of the loaded vehicles are able to store their luggage in the storage compartment while they travel comfortably in the passenger compartment within the body. Upon arrival at the destination, the procedure is reversed, allowing the vehicle drivers immediate access to their vehicles.

Referring to FIGS. 11 to 15, in a second preferred embodiment, the hitch 6 is removed. The lower structure 12 is extended to the rear 102 of the vehicle. Decking material 104 of sufficient strength to effectively support a known load of freight is supported by the truck chassis 10, for example, by mounting the decking material 104 to the lower structure 12.

Although the present invention has been described in connection with specific examples and embodiments, those skilled in the art will recognize that the present invention is capable of other variations and modifications within its scope. For example, the location of the entry door, powder room and seating arrangements may all be varied. Additionally, provisions for sleeping may be incorporated into the seating arrangement.

Furthermore, while the vehicle transport unit is shown in the figures as an open vehicle transport unit, it may just as easily be a closed vehicle transport unit, that is, an enclosed trailer unit wherein the vehicles are not exposed to the elements. Both type units are known in the art.

These examples and embodiments are intended as typical of, rather than in any way limiting on, the scope of the present invention as presented in the appended claims.

What is claimed is:

1. A transport system for simultaneously transporting freight and at least one passenger comprising:
    a passenger truck cab unit comprising a body mounted to and supported by a truck chassis and a lower structure mounted to, supported by and extending below the truck chassis for additional support of the body;
    a freight transport unit for transporting the freight; and
    a hitch mounted to and supported by the truck chassis for attaching the freight transport unit to the passenger truck cab unit,
    wherein the truck chassis comprises a cab unit mounted to a truck frame and a plurality of axles mounted to the truck frame for receiving a plurality of wheels, wherein the hitch is mounted to the truck frame;
    an engine is located in front of a driver; and
    the body includes a door opening extending below the truck chassis into the lower structure for providing an entry and exit separate from a driver compartment door and the passenger truck cab unit tows the freight transport unit.

2. The system of claim 1 wherein the freight is at least one vehicle.

3. The system of claim 2 wherein the at least one passenger is at least one vehicle operator.

4. The system of claim 1 wherein the body further comprises at least one window unit.

5. The system of claim 1 wherein the body further comprises seating for the at least one passenger.

6. The system of claim 1 wherein an attachment selected from the group consisting of air-conditioning units, heating units, HVAC units, luggage racks and combinations thereof is mounted to a body roof.

7. The system of claim 1 wherein the body further includes at least one amenity selected from the group consisting of a television monitor, a storage rack, a VCR, a DVD, a radio, and a lavatory.

8. The system of claim 1 wherein the lower structure comprises at least one compartment for storage.

9. A passenger truck cab unit for use in simultaneously transporting freight and at least one passenger comprising:
    a body mounted to and supported by a truck chassis;
    a lower structure mounted to, supported by and extending below the truck chassis for additional support of the body; and
    a hitch mounted to and supported by the truck chassis for attaching a freight transport unit to the passenger truck cab unit,
    wherein the truck chassis comprises a cab unit mounted to a truck frame having a main support beam and a plurality of axles mounted to the truck frame for receiving a plurality of wheels, wherein the hitch is mounted to the truck frame;
    an engine is located in front of a driver; and
    the body includes a door opening extending below the truck chassis into the lower structure for providing an entry and exit separate from a driver compartment door.

10. The system of claim 9 wherein the freight is at least one vehicle.

11. The system of claim 10 wherein the at least one passenger is at least one vehicle operator.

12. The passenger truck cab unit of claim 9 wherein the body further comprises at least one window unit.

13. The passenger truck cab unit of claim 9 wherein the body further comprises seating for the at least one passenger.

14. The passenger truck cab unit of claim 9 wherein the door opening further includes a stairway.

15. The passenger truck cab unit of claim 9 wherein an attachment selected from the group consisting of an air-conditioning unit, heating unit, HVAC unit, luggage rack and combinations thereof is mounted to a body roof.

16. The passenger truck cab unit of claim 9 wherein the body further includes at least one amenity selected from the group consisting of a television monitor, a storage rack, a VCR, a DVD, a radio, and a lavatory.

17. The passenger truck cab unit of claim 9 wherein the truck chassis further comprises a filler attached to the main frame support beam, the filler dimensionally sized to effectively raise the body so that a body floor mates to a driver compartment floor at substantially the same height, thereby forming a substantially step-less transition.

18. The passenger truck cab unit of claim 17 further comprising a cross member mounted to the filler, the cross member serving as a structural component of the lower structure, thereby securing the lower structure to the truck chassis.

19. The passenger truck cab unit of claim 9 whereby the lower structure comprises at least one compartment for storage.

20. The passenger truck cab unit of claim 19 wherein the at least one compartment is a baggage compartment.

21. A method for simultaneously transporting freight and at least one passenger comprising the steps of:
    loading freight onto a freight transport unit at a first location;
    attaching the freight transport unit to a passenger truck cab unit;
    loading at least one passenger on the passenger truck cab unit;
    driving the passenger truck cab unit to a second location; and off loading the freight and the at least one passenger;
wherein the passenger truck cab unit comprises
- a body mounted to and supported by a truck chassis;
- a lower structure mounted to, supported by and extending below the truck chassis for additional support of the body; and
- a hitch for attaching the freight transport unit to the passenger truck cab unit,
- wherein the truck chassis comprises a cab unit mounted to a truck frame and a plurality of axles mounted to the truck frame for receiving a plurality of wheels, wherein the hitch is mounted to the truck frame;
- an engine is located in front of a driver; and
- the body includes a door opening extending below the truck chassis into the lower structure for providing an entry and exit separate from a driver compartment door.

22. The method of claim 21 wherein the freight is at least one vehicle.

23. The method of claim 22 wherein the at least one passenger is at least one vehicle operator.

24. A passenger truck cab unit for use in simultaneously transporting freight and at least one passenger comprising:
- a body mounted to and supported by a truck chassis;
- a lower structure mounted to and supported by the truck chassis for additional support of the body; and
- a hitch mounted to and supported by the truck chassis for attaching a freight transport unit to the passenger truck cab unit,
- wherein the truck chassis comprises a cab unit mounted to a truck frame and a plurality of axles mounted to the truck frame for receiving a plurality of wheels, wherein the hitch is mounted to the truck frame;
- the truck chassis further comprises a filler attached to the main frame support beam, the filler dimensionally sized to effectively raise the body so that a body floor mates to a driver compartment floor at substantially the same height, thereby forming a substantially step-less transition; and
- the body includes a door opening extending into the lower structure for providing an entry and exit separate from a driver compartment door.

25. The passenger truck cab unit of claim 24 further comprising a cross member mounted to the filler, the cross member serving as a structural component of the lower structure, thereby securing the lower structure to the truck chassis.

26. The passenger truck cab unit of claim 24 wherein the freight is at least one vehicle.

27. The passenger truck cab unit of claim 24 wherein the body further comprises at least one window unit.

28. The passenger truck cab unit of claim 24 wherein an engine is located in front of a driver.

29. The passenger truck cab unit of claim 24 wherein the truck frame comprises a main frame support beam.

* * * * *